(12) United States Patent
Peng et al.

(10) Patent No.: US 9,967,217 B2
(45) Date of Patent: May 8, 2018

(54) METHOD AND DEVICE FOR DISPLAYING INSTANT MESSAGING MESSAGES

(71) Applicant: TENCENT TECHNOLOGY (SHENZHEN) COMPANY LIMITED, Shenzhen (CN)

(72) Inventors: Tielei Peng, Shenzhen (CN); Yu Ku, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days. days.

(21) Appl. No.: 15/399,927

(22) Filed: Jan. 6, 2017

(65) Prior Publication Data

US 2017/0118150 A1 Apr. 27, 2017

Related U.S. Application Data

(63) Continuation-in-part of application No. 13/672,159, filed on Nov. 8, 2012, which is a continuation of
(Continued)

(30) Foreign Application Priority Data

May 25, 2010 (CN) .......................... 2010 1 0186537

(51) Int. Cl.
*G06F 17/22* (2006.01)
*H04L 12/58* (2006.01)

(52) U.S. Cl.
CPC .......... *H04L 51/08* (2013.01); *G06F 17/2235* (2013.01); *H04L 51/04* (2013.01)

(58) Field of Classification Search
CPC ... G06F 3/0482; G06F 17/30864; G06F 17/24
See application file for complete search history.

(56) References Cited

U.S. PATENT DOCUMENTS 6,029,192 A * 2/2000 Hill .................... G06F 17/30864
707/E17.108
6,544,295 B1 * 4/2003 Bodnar ............. G06F 17/30884
707/E17.114
(Continued)

FOREIGN PATENT DOCUMENTS

CN 101079894 A 11/2007
CN 101082917 A 12/2007
(Continued)

OTHER PUBLICATIONS

Stackoverflow.com, Hiding images that failed to load, Oct. 2009, pp. 1-2 https://stackoverflow.com/questions/1641049/hiding-images-that-failed-to-load).*

(Continued)

*Primary Examiner* — Scott Baderman
*Assistant Examiner* — Mario M Velez-Lopez
(74) *Attorney, Agent, or Firm* — Anova Law Group, PLLC

(57) ABSTRACT

The present invention provides a method and a device for displaying instant messaging messages. The method includes detecting that an instant messaging message to be displayed includes a hyperlink; when it is detected that the instant messaging message comprises the hyperlink, pulling out abstract information corresponding to the hyperlink; filling the pulled-out abstract information in an inserted control; and displaying the instant messaging message as well as the control. The device includes a detection module, a pulling module and a display module. The invention is able to display to users the content of the hyperlink contained in the instant messaging message, therefore improving the usability and interactivity of the Instant Messenger and raising the users' experiences.

20 Claims, 4 Drawing Sheets

Related U.S. Application Data application No. PCT/CN2011/071524, filed on Mar. 4, 2011.

(56) References Cited

U.S. PATENT DOCUMENTS

| | | | |
|---|---|---|---|
| 7,325,196 | B1 | 1/2008 | Covington et al. |
| 7,814,425 | B1* | 10/2010 | O'Shaugnessy ..... G06Q 10/107 715/752 |
| 7,996,775 | B2* | 8/2011 | Cole ..................... G06F 9/4408 715/736 |
| 8,209,385 | B2* | 6/2012 | Partaker ............... G06Q 10/107 709/206 |
| 9,386,407 | B2* | 7/2016 | Malin ..................... H04W 4/22 |
| 2002/0129114 | A1* | 9/2002 | Sundaresan ........... G06F 3/0481 709/213 |
| 2004/0153517 | A1 | 8/2004 | Gang et al. |
| 2004/0205514 | A1* | 10/2004 | Sommerer ............ G06F 17/212 715/205 |
| 2004/0210532 | A1 | 10/2004 | Nagawa et al. |
| 2004/0215731 | A1 | 10/2004 | Tzann-en Szeto |
| 2005/0108033 | A1 | 5/2005 | Everett-Church |
| 2005/0120024 | A1 | 6/2005 | Tharpe, Jr. et al. |
| 2005/0204309 | A1 | 9/2005 | Szeto |
| 2007/0016490 | A1 | 1/2007 | Nowak |
| 2007/0143414 | A1 | 6/2007 | Daigle |
| 2008/0005269 | A1* | 1/2008 | Knighton ................. H04N 7/15 709/217 |
| 2009/0125835 | A1* | 5/2009 | Vaughan ............... G06F 3/0482 715/781 |
| 2009/0157834 | A1* | 6/2009 | Krishnaswamy ...... G06Q 10/10 709/206 |
| 2010/0064018 | A1 | 3/2010 | Luo |
| 2010/0070899 | A1 | 3/2010 | Hunt et al. |
| 2012/0150989 | A1* | 6/2012 | Portnoy ............ G06F 17/30876 709/217 |

FOREIGN PATENT DOCUMENTS

| | | |
|---|---|---|
| CN | 101102255 A | 1/2008 |
| JP | 2010044588 A | 2/2010 |

OTHER PUBLICATIONS

Sitepoint.com, Hide CSS background images until fully loaded, Dec. 2009, pp. 1-3 https://www.sitepoint.com/community/t/hide-css-background-images-until-fully-loaded/5690.*

* cited by examiner

METHOD AND DEVICE FOR DISPLAYING INSTANT MESSAGING MESSAGES

CROSS-REFERENCES TO RELATED APPLICATIONS

This application is a continuation application of U.S. patent application Ser. No. 13/672,159, filed on Nov. 8, 2012. U.S. patent application Ser. No. 13/672,159 is a continuation of International Application No. PCT/CN2011/071524 filed on Mar. 4, 2011. This application claims the benefit and priority of Chinese Patent Application No. 201010186537.3 filed on May 25, 2010. The entire disclosures of each of the above applications are incorporated herein by reference.

FIELD OF THE DISCLOSURE

The present invention relates to Instant Messaging (IM) technology, and specifically, relates to a method and a device for displaying instant messaging messages.

BACKGROUND

As IM (Instant Messaging) technology evolves, Instant Messenger has become an essential software tool for people's everyday life. It is not only used for leisure and entertainment purposes, but also widely used at work. The Instant Messenger allows users to an input instant messaging message containing a hyperlink as well as texts in a chat window. Here, the hyperlink, for the most part, refers to URL (Uniform Resource Locator).

When displaying an instant messaging message containing a URL, the conventional Instant Messenger only directly display the instant messaging message where the URL is located. Since the web content corresponding to the URL is unpredictable, a user receiving the instant messaging message often mistakes the URL for viruses and refuses to click on it. Therefore, a user sending the instant messaging message often needs to add a short text description for the input URL and display it together with the URL.

The disclosed method and system are directed to solve one or more problems set forth above and other problems.

BRIEF SUMMARY OF THE DISCLOSURE

In order to display the content of the hyperlink contained in the instant messaging message and improve the usability and interactivity of the Instant Messenger, embodiments of the present invention provide a method and device for displaying instant messaging messages. The technical solutions for the embodiments of the present invention are as follows:

In one aspect, a method for displaying instant messaging messages is provided, and the method includes: detecting whether an instant messaging message to be displayed includes a hyperlink; when it is detected that the instant messaging message includes the hyperlink, pulling out the abstract information corresponding to the hyperlink; inserting a control; filling the pulled-out abstract information in the inserted control; and displaying the instant messaging message and the control in which the abstract information corresponding to the hyperlink is filled.

In another aspect, a device for displaying instant messaging messages is also provided, and the device includes: a detection module, configured to detect whether an instant messaging message to be displayed includes a hyperlink; a pulling module, configured to pull out the abstract information corresponding to the hyperlink when the detection modules detected that the instant messaging message to be displayed includes the hyperlink; a display module, configured to insert a control, to fill the abstract information pulled out by the pulling module in the inserted control and to display the instant messaging message and the control in which the abstract information corresponding to the hyperlink is filled.

In another aspect, a computer-readable storage medium is further provided. The computer-readable storage medium having a program recorded thereon; where the program is to make a computer execute the above method for displaying instant messaging messages.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to the drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention.

Figure 6:
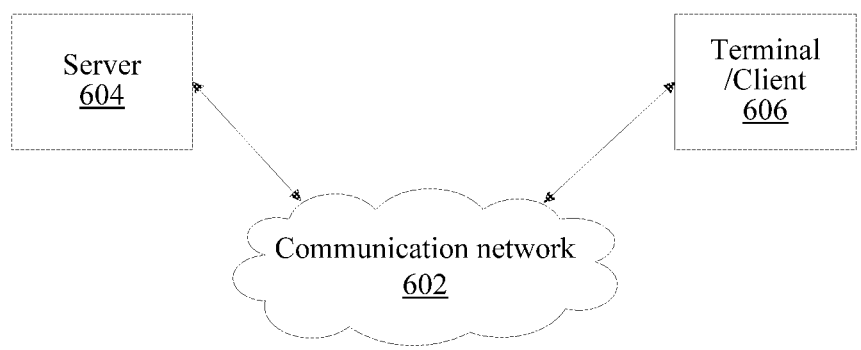
FIG. 6 illustrates an exemplary operating environment incorporating certain disclosed embodiments.

FIG. 6 depicts an exemplary environment 600 incorporating the exemplary methods and mobile terminals in accordance with various disclosed embodiments. As shown in FIG. 6, the environment 600 can include a server 604, a terminal 606, and a communication network 602. The server 604 and the terminal 606 may be coupled through the communication network 602 for information exchange, e.g., instant messaging communication, webpage information retrieving, etc. Although only one terminal 606 and one server 604 are shown in the environment 600, any number of terminals 606 or servers 604 may be included, and other devices may also be included.

The communication network 602 may include any appropriate type of communication network for providing network connections to the server 604 and terminal 606 or among multiple servers 604 or terminals 606. For example, the communication network 602 may include the Internet or other types of computer networks or telecommunication networks, either wired or wireless.

A terminal, as used herein, may refer to any appropriate user terminal with certain computing capabilities, e.g., a personal computer (PC), a work station computer, a handheld computing device (e.g., a tablet), a mobile terminal (e.g., a mobile phone or a smart phone), or any other user-side computing device.

A server, as used herein, may refer to one or more server computers configured to provide certain server functionalities, e.g., network data storage and database management. A server may also include one or more processors to execute computer programs in parallel. The server may be a messaging server that facilitates instant message communication, such as transmitting messages to corresponding user terminals. The server may be a website server that hosts internet services, such as online shopping, news sites, social network services, video/audio streaming services, etc.

Figure 7:
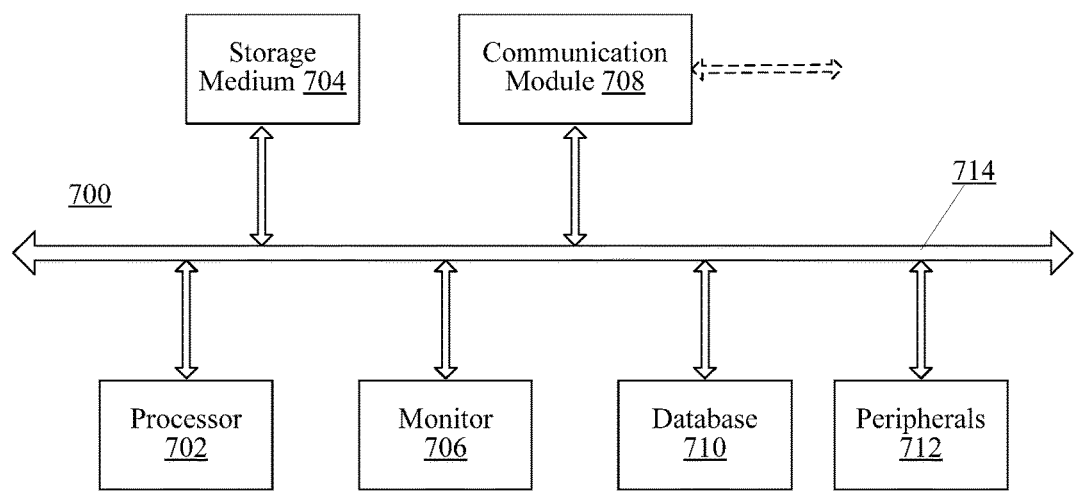
FIG. 7 illustrates a block diagram of an exemplary computer system consistent with the disclosed embodiments.

The server 604 and the terminal 606 may be implemented on any appropriate computing platform. FIG. 7 shows a block diagram of an exemplary computing system 700 capable of implementing the server 604 and/or the terminal 606. As shown in FIG. 7, the exemplary computer system 700 may include a processor 702, a storage medium 704, a monitor 706, a communication module 708, a database 710, peripherals 712, and one or more bus 714 to couple the devices together. Certain devices may be omitted and other devices may be included.

The processor 702 can include any appropriate processor or processors. Further, the processor 702 can include multiple cores for multi-thread or parallel processing. The storage medium 704 may include memory modules, e.g., Read-Only Memory (ROM), Random Access Memory (RAM), and flash memory modules, and mass storages, e.g., CD-ROM, U-disk, removable hard disk, etc. The storage medium 704 may store computer programs for implementing various processes (e.g., analyzing instant messages, retrieving webpage information, etc.), when executed by the processor 702.

The monitor 706 may include display devices for displaying contents in the computing system 700, e.g., displaying instant messages in a user interface. The peripherals 712 may include I/O devices, e.g., keyboard and mouse for inputting information by a user. The peripherals may also include certain sensors, such as gravity sensors, acceleration sensors, and other types of sensors.

Further, the communication module 708 may include network devices for establishing connections through the communication network 602. The database 710 may include one or more databases for storing certain data and for performing certain operations on the stored data, e.g., querying service identification information and corresponding rules for displaying related hyperlinks in instant messages.

In operation, the terminal 606 may implement certain instant messaging application. The terminal 606 may be configured to provide structures and functions correspondingly for related actions and operations. More particularly, when receiving an instant message containing a hyperlink, the terminal 606 may retrieve abstract information from the server 604 according to the hyperlink, and may display the abstract information with the instant message.

Embodiment I

Figure 1:
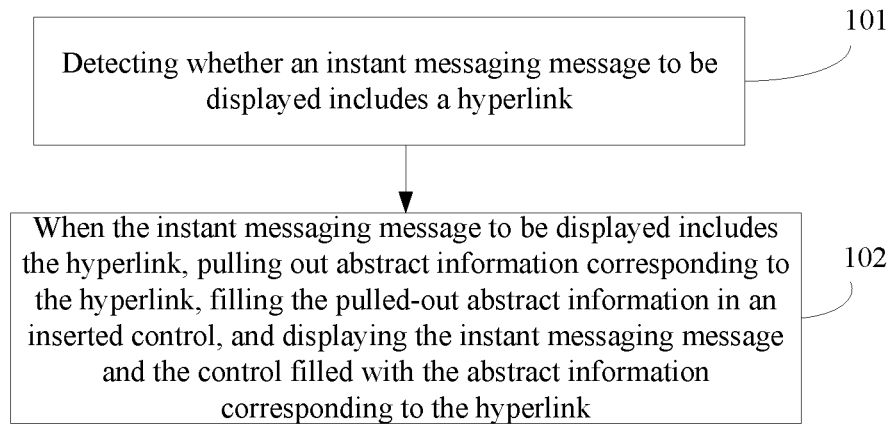
FIG. 1 is a flow chart illustrating a method for displaying instant messaging messages presented by an embodiment of the invention.
Figure 2:
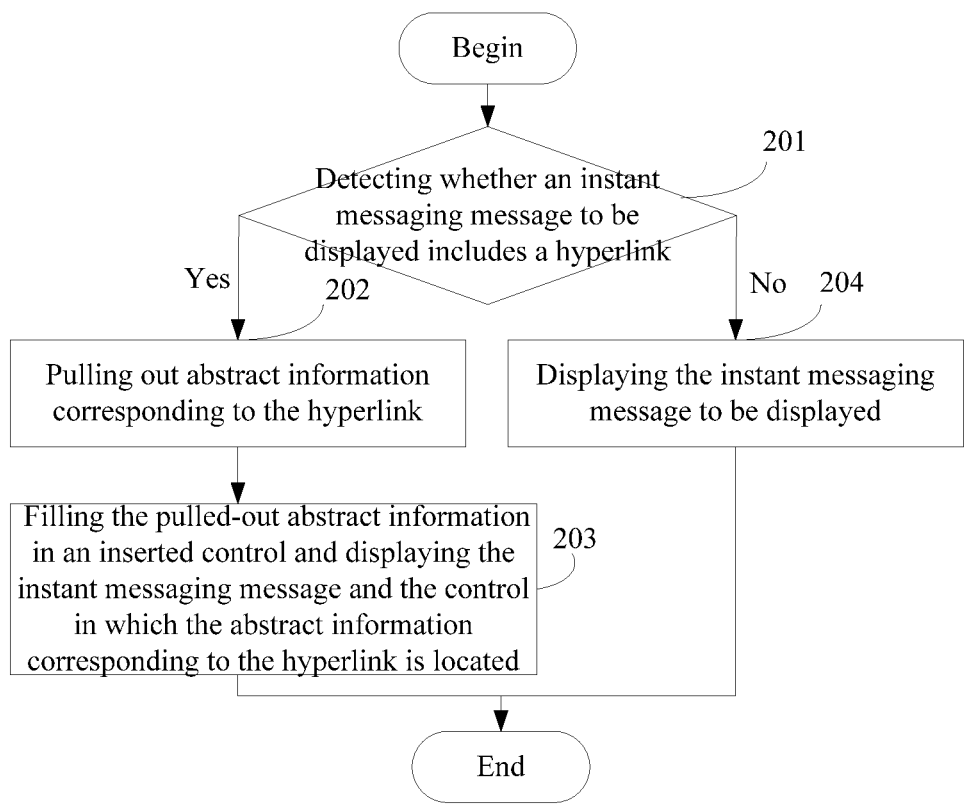
FIG. 2 is a flow chart illustrating a method for displaying instant messaging messages presented by an embodiment of the invention.

Referring to FIG. 1, this embodiment presents a method for displaying instant messaging messages, the flow chart of the method is as follows. The disclosed method may be implemented, for example, by a user terminal (e.g., terminal 606) installed with an instant messaging application.

Block 101: detecting whether an instant messaging message to be displayed includes a hyperlink. Specifically, the instant messaging application may include a graphical user interface for sending and receiving instant messages. The user may enter a message in an input box on the graphical user interface and confirm to send the message to a contact (e.g., through the communication network 602). Such message is an outgoing instant messaging message to be displayed, for example, in a chat window on the graphical user interface. Further, the instant messaging application may receive an instant message from a contact of the user (e.g., through the communication network 602). Such message is an incoming instant messaging message to be displayed, for example, in the chat window on the graphical user interface, or in a notification window on the graphical user interface. The instant messaging message (both incoming and outgoing messages) may include text, image, audio, and/or video information. The user terminal may determine whether the instant messaging message includes information of a hyperlink.

The hyperlink may include an URL (Uniform Resource Locator). That is, when the user terminal detects that the instant messaging message includes a text of an URL, the user terminal may determine that the instant messaging message includes a hyperlink. Any text string detection method may be implemented on the user terminal to detect an URL/hyperlink included in an instant messaging message. For example, the user terminal may search, in the instant messaging message, for a string that includes/starts with certain character combinations (e.g., http, www), and/or ends with certain character combinations (e.g., .htm or .html). The string may not include space in its characters. A string satisfying the search criteria may be extracted and recognized as an URL for further processing.

Block 102: when it is detected that the instant messaging message to be displayed includes the hyperlink, pulling out abstract information corresponding to the hyperlink, filling the pulled-out abstract information in an inserted control, and displaying the instant messaging message and the control in which the abstract information corresponding to the hyperlink is located. Herein, the control may be inserted either behind or in front of the hyperlink.

By means of when detecting that a hyperlink is contained in an instant messaging message to be displayed, pulling out abstract information corresponding to the hyperlink, filling the pulled-out abstract information in a control inserted behind the hyperlink, and displaying the control in which the abstract information corresponding to the hyperlink is located, the method provided by this embodiment is able to display to users the content of the hyperlink contained in the instant messaging message. This prevents the user from mistaking the hyperlink for viruses and refusing to click on it while eliminating the need for the user to input text descriptions of the hyperlink, therefore improving the usability and interactivity of the Instant Messenger and raising the user's experience.

Embodiment II

This embodiment presents a method for displaying instant messaging messages, particularly instant messaging messages containing hyperlinks. By pulling out and displaying the abstract information corresponding to a hyperlink, the embodiment enriches interface display logics to meet users' needs. Referring to FIG. 1, the flow chart of this embodiment is described as follows:

Block 201: detecting whether an instant messaging message to be displayed includes a hyperlink, when it is detected that the instant messaging message includes the hyperlink, performing Block 202, and otherwise, performing Block 204.

For this block, as many techniques are available for detecting the hyperlink, as to how to detect whether an instant messaging message to be displayed includes a hyperlink, this embodiment will not set out specific examples and existing techniques can be used to achieve this purpose.

Block 202: pulling out abstract information corresponding to the hyperlink.

Herein, the step of pulling out the abstract information corresponding to the hyperlink may also be achieved using the existing techniques and therefore this embodiment will not specify either the method used for pulling out the abstract information or the content of the abstract information pulled out.

Optionally, in order to control the display of the abstract information corresponding to the hyperlink, this embodiment adopts a predetermined rule, i.e., when a hyperlink is detected in an instant messaging message to be displayed, the solution presented by this embodiment will first verify whether the hyperlink matches the predetermined rule and only when the hyperlink is verified as matching the predetermined rule, can the abstract information be pulled out.

This embodiment does not specify the contents or forms of the predetermined rule. To control the display of a specific hyperlink, the user can set limits on the range of the hyperlink of which the abstract information is to be displayed by setting a rule in advance. In practice, the rule for the hyperlink may be set based on the URL of a type of service. When displaying an instant messaging message including a hyperlink, the abstract information corresponding to the hyperlink of that type of service is allowed to be displayed, i.e., the abstract information corresponding to the hyperlink within the range limited by the predetermined rule can be displayed. In that case, different rules may be set for different types of services, and different hyperlinks may also correspond to different rules. In addition, after being determined, the rule can be saved and updated. Here, take a solution of rule updating adopting common configurations for example. In practice, each service is assigned with an ID (Identity) for its identification, and a controllable flag can be added for each type of service to achieve safety control. Here is an example.

The URL corresponding to Service A is http://abc.orz.xx.com, and the ID of Service A is 000386. The URL corresponding to Service B is http://xyz.com and the ID of Service B is 000123. Based on the URL of Service A, the rule for the hyperlinks of Service A is http://abc.orz.xx.com/000386.htm, and based on the URL of Service B, the rule for the hyperlinks of Service B is http//xyz.com/000123.htm.

As to the method for verifying whether a hyperlink matches the predetermined rule, since analysis of the instant messaging message received is needed and the regular expression is widely recognized as the most powerful text analysis tool, this embodiment uses some libraries from the ATL (Active Template Library) for regular expressions to illustrate how to match a hyperlink with the predetermined rule, specifically as below:

1. CATLRegExp class, this class is a regular expression class supported by ATL engineering and is a generic name for ATL.

Declaration:
template<class CharTraits=CAtlRECharTraits>
class CAtlRegExp;

Those skilled in this art can obviously understand that this section is to declare an ALT template class.

Initialization:
CATLRegExp does not provide any initialization matching string in a constructed function, instead it allows the user to use a regular expression string as a parameter by invoking its Parse( )method to construct a class we need for matching. For instance, for matching a time format, it can be h:mm or hh:mm. The CAtlRegExp class constructed can be expressed as follows:

CAtlRegExp<>re;
re.Parse("{[0-9]?'[0-9]}:{[0-9][0-9]}");

Parse( ) converts the regular expression into a program for the CAtlRegExp internal pattern-matching automaton. Multiple metacharacters are understood by CAtlRegExp for identifying the matching rules. Specifically, "[]" indicates a character class, and CAtlRegExp can match any character inside the brackets. In this time format example, [0-9] means any digits from 0-9 is considered as a match. "?" indicates that the preceding expression is optional: it matches once or not at all. Accordingly, [0-9]?[0-9] means any one digit or double digits can be considered as a match. "{}" indicates a match group. The actual text in the input that matches the expression inside the braces can be retrieved through the CAtlREMatchContext object.

This section is to use the regular expression to construct a class needed for matching.

Matching:
By invoking the Match( ) method of CATLRegExp, the class can be used for matching. The prototype of the Match( ) method is as below:

BOOL Match(const RECHAR *szIn, CAtlREMatchContext<CharTraits>*pContext, const RECHAR **ppszEnd=NULL)

In the time format example, calling re.Match("1:57", &mc) returns TRUE, and indicates a successful match; and calling re.Match("01/03", &mc) returns FALSE and indicates no match.

This section is the declaration of the match function and the specific meaning of its parameters will be explained in the next paragraph.

The result of matching is returned via the CAtlREMatchContext<>class which the second parameter pContext points to. The result of matching and relevant information is all saved in the CAtlREMatchContext class. The result of matching can be obtained just by accessing CAtlREMatchContext and its members.

2. CAtlREMatchContext class
Declaration:
template<class CharTraits=CAtlRECharTraits>
class CAtlREMatchContext This section is a declaration of a matching result class.

Usage:
CAtlREMatchContext provides an invoker with information of a matching result via an m_uNumGroups member and a GetMatch ( ) method. Herein, the m_uNumGroups represents the number of the Groups matched. In the time format example, the number of groups is two. The Get-Match( ) returns pointers of pStart and pEnd of the matched string based on the Index values of the Groups transmitted to it. With these two pointers, the invoker can easily get the matching result.

That is, a regular expression for a target website/service may be used to generate a predetermined rule corresponding to the service. For example, URLs of a target service may include a general format as "A.aa.com/B.htm" where A and B represents optional characters, and "aa.com" are unchanged characters. Variations such as http://aa.com/b123.htm, www.cde.aa.com/fgh.htm, and aa.com/5k/789.htm may all be considered as matching the general format. The regular expression may be written to cover all these variations while excluding URLs that do not belong to the desired service. An example of a URL that does not match the general format may be http://aab.com/b123.htm. Accordingly, the predetermined rule generated based on the regular expression and the classes defined with ATL can be used to find whether a URL matches with a target service.

For ease of comprehension, this embodiment takes the predetermined rule corresponding to service http://xyz.news.aa.com/000386.htm for example to illustrate in more detail the matching process based on the above described matching method.

If the hyperlink is http://xyz.news.aa.com/20100521/000386.htm, when invoking the class in the aforementioned ATL for matching the rule, it can be found that the content of the hyperlink matches the predetermined rule. However, for the hyperlink http://x.s.com/abc, since the content of the hyperlink is disparate from that of the predetermined rule, the hyperlink is thus verified as mismatching the predetermined rule.

Furthermore, apart from placing limits on the scope of the hyperlink of which the abstract information is to be displayed, setting the rule beforehand can limit the content of the abstract information pulled out. Namely, after detecting a hyperlink in an instant messaging message to be displayed and verifying that the hyperlink matches the predetermined rule, the method can pull out the abstract information corresponding to the hyperlink according to the predetermined rule. If the predetermined rules are different, the abstract information pulled out is of different types. In practice, this can be achieved by introducing additional limitations on the original predetermined rule. In other words, the different types of service may be associated with different predetermined rules. Further, the type of information to be pulled out may be predetermined based on the type of service and associated with the corresponding predetermined rule.

For example, a URL of a webpage hosted by Service A (e.g., http://xyz.shopping.com/000386.htm) may be detected in the text of the instant messaging message as matching a predetermined rule associated with Service A. Service A may host a predetermined type of information of the webpage at a controlled URL. The controlled URL is obtained based on the predetermined rule (e.g., by adding elements corresponding to the predetermined type to the original URL). For example, the user terminal may identify the predetermined type of information associated with URLs hosted by service A includes at least one of an abstract text, a picture and a price of the commodity. Accordingly, the user terminal may modify the to-be-displayed hyperlink as the controlled URL (e.g., http://xyz.shopping.com/000386.htm/price) based on predetermined type associated with the predetermined rule. That is, the specific type of information corresponding to the hyperlink based on the predetermined rule and associated type of service may be pulled out and displayed.

For instance, the predetermined rule corresponding to service http://xyz.shopping.com/000369.htm refers to a hyperlink to an online shopping webpage. If an operator hopes to display the prices of the commodities shown on the webpage while displaying the hyperlink matching the rule, what we need to do is to reset a rule to http://xyz.shopping.com/000369.htm/price by adding a further limitation to the original predetermined rule, and if the hyperlink matches the new rule, the information on commodity prices on the webpage corresponding to the hyperlink will be pulled out and displayed as the abstract information corresponding to the hyperlink. If the operator hopes to display the pictures of the commodities on the webpage, a rule is reset to http://xyz.shopping.com/000369.htm/picture and the pictures of the commodities in question on the webpage corresponding to the hyperlink will be pulled out. Of course, the rule can be set to display both the prices and the pictures. In addition, the predetermined rule can be used for other purposes and be set in other ways. This embodiment does not have specific limitations for this.

Block 203: filling the pulled-out abstract information in an inserted control and displaying the instant messaging message and the control in which the abstract information corresponding to the hyperlink is located. The flow is ended.

Specifically, the display of the instant messaging message can be achieved via the existing techniques. This embodiment does not have specific limitations for this. The embodiment does not have any specific limitations either as to how to display the abstract information corresponding to the hyperlink and illustrates this just through an example of displaying the abstract information corresponding to the hyperlink by means of a control. In practice, an empty control may be inserted either behind or in front of a hyperlink and then be hidden in the chat window. After being pulled out, the abstract information corresponding to the hyperlink is filled in the control inserted. In other words, the inserted control may be hidden until the predetermined type of information of the webpage corresponding to the hyperlink is pulled out and filled in the inserted control. Afterwards, the control is displayed either after the display of the instant messaging message (i.e., a time of displaying the instant messaging message is later than a time of displaying the control) or simultaneously with the instant messaging message. If it fails to pull out the abstract information corresponding to the hyperlink, no display will be made, namely, the hidden control will remain hidden. In order to save space, the empty control may even be deleted after the failure of pulling out of the abstract information. The embodiment does not have specific limitations for this.

Simultaneously displaying an instant messaging message and the inserted control refers to a process in which the abstract information corresponding to the hyperlink is pulled out first, the abstract information is filled in the control, and then the instant messaging message is displayed together with the control in which the abstract information is located. For the process in which the control is displayed after the display of the instant messaging message, the abstract information may be displayed either before or after a subsequent instant messaging message to be displayed. For instance, if a new instant messaging message to be displayed comes in after the instant messaging message to be displayed is displayed and before the abstract information corresponding to the hyperlink is pulled out or displayed, (for descriptive convenience, all new instant messaging messages to be displayed coming in after the instant messaging message in question are called, in this embodiment, subsequent instant messaging messages to be displayed) the subsequent instant messaging message to be displayed may be displayed after the instant messaging message in question is displayed. After the abstract information corresponding to the hyperlink is pulled out, the display window is then put in a place where the inserted control is located to display the pulled-out abstract information. In other words, when a subsequent instant messaging message is received before the predetermined type of information of the webpage corresponding to the hyperlink is pulled out, the subsequent instant messaging message is displayed in the chat window before the control filled with the pulled-out information is displayed in the chat window. Of course, the subsequent instant messaging message to be displayed may also be saved in a cache memory and be displayed after the pulled-out abstract information is displayed. This embodiment does not have specific limitations for this.

Specifically, since a hyperlink may need to be displayed more than once, if matching with the predetermined rule needs to be done every time or the corresponding abstract information needs to be pulled out every time, it will be a waste of traffic and result in a decline in response speed. In order to raise efficiency, after pulling out the abstract information corresponding to the hyperlink, the method presented by this embodiment also includes a step of storing the hyperlink and the corresponding abstract information. When it is detected that the hyperlink is included in a subsequent instant messaging message, the subsequent instant messaging message and the stored abstract information corresponding to the hyperlink may be displayed directly to avoid a repeated pulling-out operation, in turn raising respond speed while saving traffic. As to how to store the hyperlink and the corresponding abstract information, this embodiment does not have specific limitations. For instance, a two-level cache memory can be used to store the hyperlink and the abstract information. The first-level cache memory caches relationship between the hyperlink URL and the predetermined rule. If they match up, the abstract information corresponding to the hyperlink will be displayed directly, in turn avoiding overhead caused by rule matching. The second-level cache memory caches the abstract information corresponding to the hyperlink and directly fills the abstract information in the corresponding control when the abstract information matches the hyperlink, in turn reducing the volume of resources and time needed for pulling out data.

In addition, while a chat window is stretching, a custom control inserted needs to change its size accordingly in order to fit in the new size of the chat window. In practice, the custom control needs to be able to sense the change in the size of the chat window. This process can be described briefly as follows: an instance object of the custom control is cached in a chat window layer, a notification will be sent to the custom control when the chat window changes its size and a control layer provides a corresponding interface for changing the arrangement of its internal control as well as the position thereof and the like.

Block 204: displaying the instant messaging message to be displayed. This flow is ended.

In this step, when an instant messaging message to be displayed does not include a hyperlink, the existing techniques can be used to display the instant messaging message to be displayed. This embodiment does not have limitations for specific display methods. In addition, if a step of controlling the display of the abstract information corresponding to the hyperlink is performed, when the hyperlink does not match the predetermined rule, the entire flow will end immediately after the display of the instant messaging message, and no subsequent step such as pulling out information needs to be performed any more.

It is important to note that an instant messaging message to be displayed needs to be displayed, whether or not the instant messaging message includes a hyperlink and whether or not the hyperlink included matches the predetermined rule. The step of displaying the instant messaging message may also precede the step of detecting whether the instant messaging message includes a hyperlink or the step of pulling out the abstract information corresponding to the hyperlink or the step of filling the pulled-out abstract information in the control inserted behind the hyperlink. In an instance presented by this embodiment, the display of the instant messaging message takes place after the pulled-out abstract information is filled in the inserted control. However, the embodiment does not have limitations for this.

In addition, the method for displaying instant messaging messages presented by this embodiment illustrates how to display the abstract information corresponding to a hyperlink included in an instant messaging message when the receiving end of the instant messaging message receives the instant messaging message including only a hyperlink but not the abstract information. Besides, enlightened from the method presented by this embodiment, it may be detected whether a hyperlink is included in an instant messaging message at the transmitting end of the instant messaging message before the instant messaging message is transmitted out. When it is detected that the instant messaging message includes a hyperlink, the pulled-out abstract information will be sent to the receiving end together with the instant messaging message and the receiving end will directly display the instant messaging message and the abstract information corresponding to the hyperlink. That is to say, the steps of detecting the hyperlink in the instant messaging message and pulling out the abstract information corresponding to the hyperlink may be performed either at the receiving end of the instant messaging message or at the transmitting end thereof. This embodiment does not have specific limitations for this.

By means of when detecting that a hyperlink is contained in an instant messaging message to be displayed, pulling out abstract information corresponding to the hyperlink, filling the pulled-out abstract information in a control inserted, and displaying the control in which the abstract information corresponding to the hyperlink is located, the method presented by the embodiment is able to display to a user the content of the hyperlink contained in the instant messaging message. This prevents the user from mistaking the hyperlink for viruses and refusing to click on it while eliminating the need for the user to input text descriptions of the hyperlink, therefore improving the usability and interactivity of the Instant Messenger and enhancing the user's experience. This method can also help raise display efficiency by storing the pulled-out abstract information and directly displaying such information when needed next time.

Embodiment III

Figure 3:
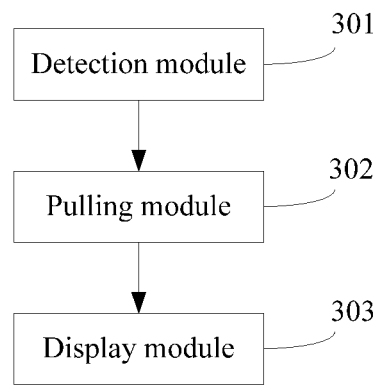
FIG. 3 is a schematic diagram showing a structure of a device for displaying instant messaging messages presented by an embodiment of the invention.

Referring to FIG. 3, this embodiment presents a device for displaying instant messaging messages. The device includes: a detection module 301, configured to detect whether an instant messaging message to be displayed includes a hyperlink; a pulling module 302, configured to pull out abstract information corresponding to the hyperlink when the detection module 301 detects that the instant messaging message to be displayed includes the hyperlink; and a display module 303, configured to fill the abstract information pulled out by the pulling module 302 in an inserted control and to display the instant messaging message as well as the control where the abstract information corresponding to the hyperlink is located. The control may be inserted either behind or in front of the hyperlink.

In the device, the display module 303 may display the instant messaging message either before the detection module 301 performs the detection or before the pulling module 302 pulls out the abstract information. This embodiment does not have specific limitations for this.

Figure 4:
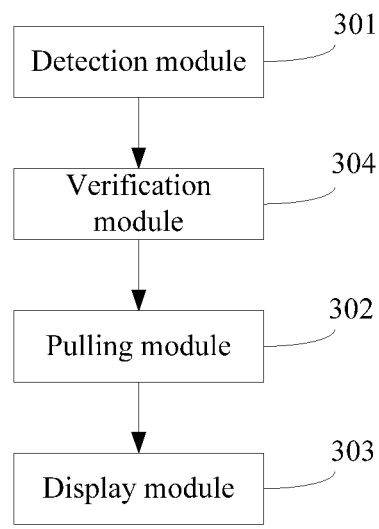
FIG. 4 is a schematic diagram showing another structure of the device for displaying instant messaging messages presented by an embodiment of the invention.

Optionally, referring to FIG. 4, the device for displaying instant messaging messages may further include: a verification module 304, configured to when the detection module 301 detects that the instant messaging message to be displayed includes the hyperlink, verify whether the hyperlink matches a predetermined rule.

Accordingly, the pulling module 303 is specifically configured to pull out the abstract information corresponding to the hyperlink after the verification module 304 verifies that the hyperlink matches the predetermined rule.

Specifically, the display module 303 is configured to insert an empty control behind or in front of the hyperlink, to hide the inserted control, to fill the abstract information pulled out by the pulling module 302 in the inserted control, and to display the control after displaying the instant messaging message or display the instant messaging message and the control simultaneously.

Furthermore, the display module 303 may be further configured to display a subsequent instant messaging message to be displayed before or after displaying the abstract information corresponding to the hyperlink.

Figure 5:
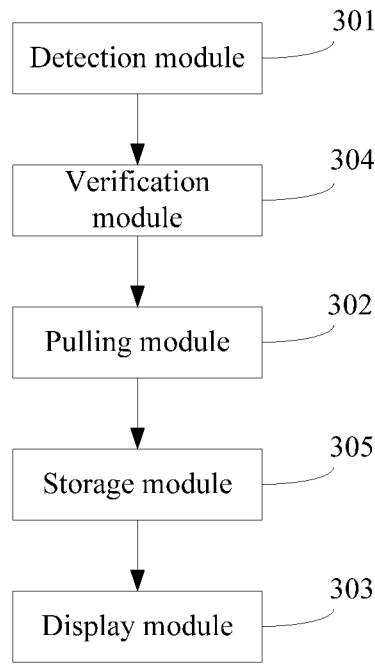
FIG. 5 is a schematic diagram showing another structure of the device for displaying instant messaging messages presented by an embodiment of the invention.

Specifically, referring to FIG. 5, the device for displaying instant messaging messages may further include: a storage module 305, configured to store the hyperlink and the abstract information corresponding to the hyperlink after the pulling module 302 pulls out the abstract information corresponding to the hyperlink.

Accordingly, the display module 303 may further be configured to when it is detected that the subsequent instant messaging message to be displayed includes the hyperlink, directly display the subsequent instant messaging message and the stored abstract information corresponding to the hyperlink.

To sum up, by means of when detecting that a hyperlink is contained in an instant messaging message to be displayed, pulling out abstract information corresponding to the hyperlink, filling the pulled-out abstract information in a control inserted behind or in front of the hyperlink, and displaying the control in which the abstract information corresponding to the hyperlink is located, the device presented by the embodiment is able to display to a user the content of the hyperlink contained in the instant messaging message. This prevents the user from mistaking the hyperlink for viruses and refusing to click on it while eliminating the need for the user to input text descriptions of the hyperlink, therefore improving the usability and interactivity of the Instant Messenger and enhancing the user's experience. This device can also help raise display efficiency by storing the pulled-out abstract information and directly displaying such information when needed next time.

It is important to note that in illustrating how the device presented by the above embodiment displays instant messaging messages, the above descriptions are based on division of functions of the above modules. In practice, the above functions may be assigned to different modules according to specific needs, namely dividing the internal structure of the device into different functional modules to perform all or part of the functions described above. In addition, the above embodiment presenting the device for displaying instant messaging messages and the embodiment presenting the method for displaying instant messaging messages described in previous paragraphs are derived from the same concept. The specific steps of implementing the embodiments presenting the device can be found in the description of the embodiment presenting the method and will not be discussed again herein.

The serial numbers used in the embodiments of the invention are just for descriptive purposes and do not represent the qualities of the embodiments.

All or part of the steps in the embodiments of the invention may be achieved with the help of software. Applicable software programs may be stored in a readable storage medium, such as an optical disk or a hard disk or the like.

The foregoing is only embodiments of the present invention and is not used to limit the protection scope of the present invention. Any modification, equivalent substitution and improvement without departing from the spirit and principle of the present invention are within the protection scope of the present invention.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

What is claimed is:

1. A method for displaying instant messaging messages, comprising:
   detecting that an instant messaging message to be displayed includes a hyperlink;
   when the instant messaging message includes the hyperlink, verifying whether the hyperlink matches a predetermined rule based on uniform resource locators (URLs) of a type of service, wherein the predetermined rule comprises assigning each service with an identification (ID) and adding a flag for each type of service;
   when the hyperlink matches the predetermined rule, pulling out a predetermined type of information of a webpage corresponding to the hyperlink, wherein the predetermined type is identified according to the type of service;
   inserting a control in a chat window;
   filling the pulled-out information of the webpage in the inserted control; and
   displaying, in the chat window, the instant messaging message as well as the control filled with the information of the webpage corresponding to the hyperlink.

2. The method according to claim 1, wherein, the control is inserted in front of the hyperlink in the chat window.

3. The method according to claim 1, wherein, the inserting a control comprises:
   inserting an empty control in front of or behind the hyperlink, wherein the inserted control is hidden until the predetermined type of information of the webpage corresponding to the hyperlink is pulled out and filled in the inserted control.

4. The method according to claim 3, further comprising:
   when pulling out the predetermined type of information is failed, the empty control remains hidden.

5. The method according to claim 1, wherein, the control is displayed after displaying the instant messaging message.

6. The method according to claim 1, further comprising:
   when a subsequent instant messaging message is received before the predetermined type of information of the webpage corresponding to the hyperlink is pulled out, displaying, in the chat window, the subsequent instant messaging message to be displayed before the control filled with the pulled-out information is displayed.

7. The method according to claim 1, further comprising:
when a subsequent instant messaging message is received before the predetermined type of information of the webpage corresponding to the hyperlink is pulled out, saving the subsequent instant messaging message to be displayed in a cache memory; and
displaying, in the chat window, the subsequent instant messaging message to be displayed after the control filled with the pulled-out information is displayed.

8. The method according to claim 1, wherein, after pulling out the information of the webpage corresponding to the hyperlink, the method further comprises:
storing the hyperlink and the information of the webpage corresponding to the hyperlink; and
when a subsequent instant messaging message to be displayed comprises the hyperlink, displaying the subsequent instant messaging message together with the stored information of the webpage corresponding to the hyperlink.

9. The method according to claim 1, wherein,
the steps of detecting that an instant messaging message to be displayed comprises a hyperlink and pulling out information of the webpage corresponding to the hyperlink are performed by a transmitting end for the instant messaging message, and the pulled-out information is transmitted together with the instant messaging message by the transmitting end to a receiving end.

10. The method according to claim 1, wherein: the predetermined type corresponding to the type of service includes at least one of: a text, a price, and a picture in the webpage corresponding to the hyperlink.

11. A device for displaying instant messaging messages, comprising:
a processor; and
a memory storing computer-readable instructions that when executed by the processor cause the processor to:
detect that an instant messaging message to be displayed comprises a hyperlink;
when the instant messaging message to be displayed comprises the hyperlink, verify whether the hyperlink matches a predetermined rule based on uniform resource locators (URLs) of a type of service, wherein the predetermined rule comprises assigning each service with an identification (ID) and adding a flag for each type of service;
when the hyperlink matches the predetermined rule, pull out a predetermined type of information of a webpage corresponding to the hyperlink, wherein the predetermined type is identified according to the type of service;
insert a control, in a chat window;
fill the information pulled out in the inserted control; and
display, in the chat window, the instant messaging message as well as the control filled with the information of the webpage corresponding to the hyperlink.

12. The device according to claim 11, wherein the computer-readable instructions when executed by the processor cause the processor to:
insert an empty control in front of or behind the hyperlink, wherein the inserted control is hidden until the predetermined type of information of the webpage corresponding to the hyperlink is pulled out and filled in the inserted control.

13. The device according to claim 11, wherein the computer-readable instructions when executed by the processor cause the processor to: when a subsequent instant messaging message is received before the predetermined type of information of the webpage corresponding to the hyperlink is pulled out, display, in the chat window, the subsequent instant messaging message to be displayed before the control filled with the information of the webpage corresponding to the hyperlink is displayed.

14. The device according to claim 11, wherein the computer-readable instructions when executed by the processor cause the processor to: when a subsequent instant messaging message is received before the predetermined type of information of the webpage corresponding to the hyperlink is pulled out, save the subsequent instant messaging message to be displayed in a cache memory; and display, in the chat window, the subsequent instant messaging message to be displayed after the control filled with the pulled-out information is displayed.

15. The device according to claim 11, wherein the computer-readable instructions when executed by the processor cause the processor to: store the hyperlink and the information of the webpage corresponding to the hyperlink after the information of the webpage corresponding to the hyperlink is pulled out; and
when the subsequent instant messaging message to be displayed comprises the hyperlink, display the subsequent instant messaging message and the stored information of the webpage corresponding to the hyperlink.

16. The device according to claim 11, wherein the computer-readable instructions when executed by the processor cause the processor to:
when pulling out the predetermined type of information is failed, delete the empty control.

17. The device according to claim 11, wherein, the control is inserted in front of the hyperlink in the chat window.

18. The device according to claim 11, wherein: the predetermined type corresponding to the type of service includes at least one of: a text, a price, and a picture of the webpage corresponding to the hyperlink.

19. The device according to claim 11, wherein: the processor is located at a receiving end for the instant messaging message.

20. A non-transitory computer-readable storage medium having a program recorded thereon; where the program is to make a computer execute a method for displaying instant messaging messages, the method comprising:
detecting that an instant messaging message to be displayed comprises a hyperlink;
when the instant messaging message includes the hyperlink, verifying whether the hyperlink matches a predetermined rule based on uniform resource locators (URLs) of a type of service, wherein the predetermined rule comprises assigning each service with an identification (ID) and adding a flag for each type of service;
when the hyperlink matches the predetermined rule, pulling out a predetermined type of information of a webpage corresponding to the hyperlink, wherein the predetermined type is identified according to the type of service;
inserting a control in a chat window;
filling the pulled-out information of the webpage in the inserted control; and
displaying, in the chat window, the instant messaging message as well as the control filled with the information of the webpage corresponding to the hyperlink.

* * * * *